Sept. 26, 1967    B. L. TERRY    3,343,704
ELECTRICAL OUTLET BOX

Filed Oct. 11, 1965    2 Sheets-Sheet 1

BOBBY L. TERRY
INVENTOR.

BY John C. Stahl

ATTORNEY

Sept. 26, 1967  B. L. TERRY  3,343,704
ELECTRICAL OUTLET BOX
Filed Oct. 11, 1965  2 Sheets-Sheet 2

BOBBY L. TERRY
INVENTOR.

BY
John C. Stahl
ATTORNEY

United States Patent Office 3,343,704
Patented Sept. 26, 1967

3,343,704
ELECTRICAL OUTLET BOX
Bobby L. Terry, 843 Zachry Drive,
San Antonio, Tex. 78228
Substituted for abandoned application Ser. No. 272,629,
Apr. 12, 1963. This application Oct. 11, 1965, Ser. No.
500,470
5 Claims. (Cl. 220—3.4)

ABSTRACT OF THE DISCLOSURE

An electrical outlet box including an upstanding cylindrical member and a receptacle holder secured therein; said cylindrical member is embedded in concrete and the upper portion removed in proximity to the surface of said concrete. The receptacle holder includes means whereby the floor plate is flush with and parallel to the finished flooring.

---

The subject invention relates to an electrical outlet box and more particularly to an outlet box which may be used with special adapters as a junction box or underground or burial box.

Although several prior art electrical outlet boxes or receptacles have heretofore been used, they have not proven entirely satisfactory under all conditions of service. One feature common to each construction is that the portion comprising the junction box is of fixed, predetermined height with a receptacle holder screwingly inserting into said box portion. The upper surface of said receptacle holder must be adjusted to the predetermined floor level by screwing the holder into the junction box to the required extent prior to pouring concrete around the box. It is obvious, therefore, that a very time consuming process of leveling, including grade shots, is required for the proper alignment and adjustment of such type box. Also, in the pouring of concrete around such box, concrete often completely covers the uppermost portion thereof and unless this is immediately removed the box is buried.

Furthermore, it is very difficult and time consuming to anchor the boxes so that they will be maintained in vertical alignment during the pouring process. If such boxes are struck or pushed out of vertical alignment the receptacle holder inserting therein will not be flush with the flooring.

The general purpose of this invention is to provide an electrical outlet box which embraces all the advantages of similarly employed prior art devices yet possesses none of the aforesaid disadvantages. To attain this the present invention contemplates a box including an integral, cylindrical portion sufficiently high to accommodate any conventional floor thickness; after the concrete is poured to the desired thickness the cylindrical portion is cut off at the surface of the concrete; a unique pivoting arrangement is provided to secure the receptacle holder to the cylindrical portion whereby the upper surface of the receptacle holder is always parallel to the floor surface. The subject invention may be used, with separate adapters, as a junction box or as an underground or burial box.

An object of the present invention is the provision of an electrical outlet box which may be used in concrete flooring varying from two and one-half inches to six inches in thickness.

Another object is to provide such an electrical outlet box including means whereby the receptacle holder is always parallel to the floor.

A further object of the invention is the provision of such a box wherein a time consuming leveling process is not required prior to the pouring of the concrete.

Still another object is to provide an outlet box which may not inadvertently be buried in the concrete.

Yet another object of the present invention is the provision of an electrical outlet box which is simple in construction, easy to use, inexpensive to manufacture, and universal in its adaptability.

A still further object is to provide a combination electrical outlet box, junction box and underground or burial box.

Other objects and features of the invention will become apparent to those skilled in the art as the disclosure is made in the following detailed description of preferred embodiments of the invention as illustrated in the accompanying sheets of drawing in which.

Figure 1:
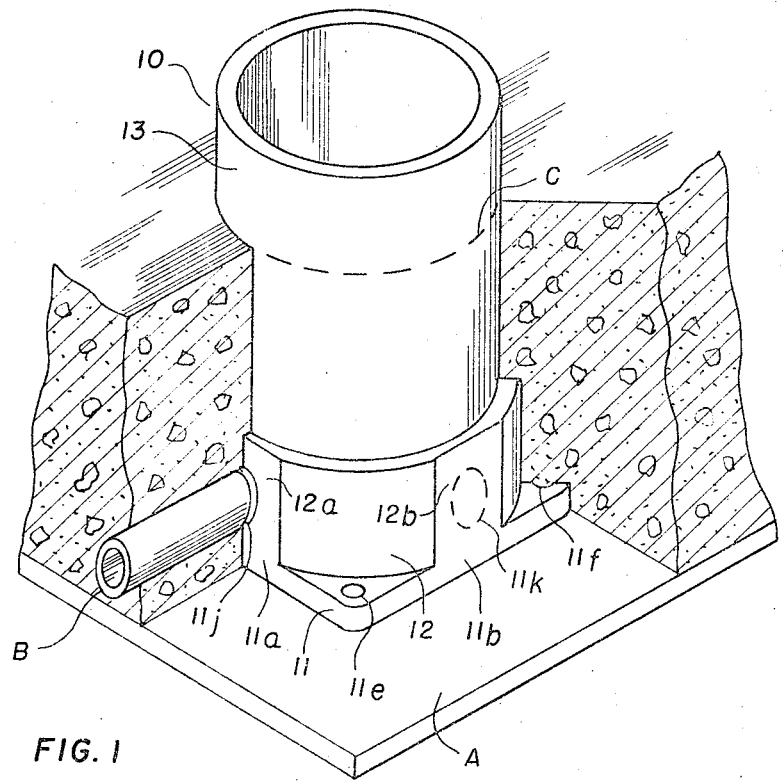
FIG. 1 illustrates a perspective view showing the electrical outlet box of the subject invention installed in a poured concrete floor with a portion of the concrete cut away.

Referring now to the drawings wherein like reference characters designate like or corresponding parts throughout the several views, there is shown in FIG. 1 an electrical outlet box 10 consisting of a base 11, a hollow, essentially cylindrical junction box 12, and a slightly offset, vertically extending, hollow, cylindrical extension 13. Box 10 is of unitary construction and preferably is constructed of an impact resistant phenolic compound which is flame and weather resistant and not affected by heat exposure temperatures to 275° Fahrenheit. It is to be understood, of course, that said box may also be constructed of any suitable plastic, ceramic, hard rubber, or metallic composition. Box 12 preferably includes vertical flats 12a–12d (12c, 12d not shown) at 90° spacings, the lower portions of which align with segments 11a–11d (11c, 11d not shown), respectively, of base 11. The base 11 may include vertical bores 11e–11h (11g, 11h not shown) in the outermost portions of the four corners to be used in anchoring box 10. The flats 12a–12d and the base 11 may optionally be provided with threaded openings 11j–11m (11k–11m not shown) in either one-half or three-quarter inch pipe sizes. Plugs (not shown) may optionally be inserted into any non-used threaded openings.

The over-all height of box 10 is approximately six inches allowing said box to be used in any concrete floor construction ranging from two and one-half to six inches in thickness as will hereinafter be described in detail.

As best seen in FIG. 1, base 11 is positioned on the frame or deck A at the desired location; an electrical conduit B screwingly inserts into the appropriate female threaded portion in flats 12a–12d or in the base 11. As heretofore mentioned, the box may be secured to deck A in a conventional manner through bores 11e–11h. The concrete is then poured around box 10 to the desired thickness and preferably is troweled smooth around the periphery of said cylindrical extension 13. After the concrete has had sufficient time to set cylindrical extension 13 is cut off at the upper surface C of the poured concrete by sawing or the like. A sharp bladed instrument may be drawn over the top edge and the upper, interior portions of extension 13 to provide a smooth surface.

Figure 2:
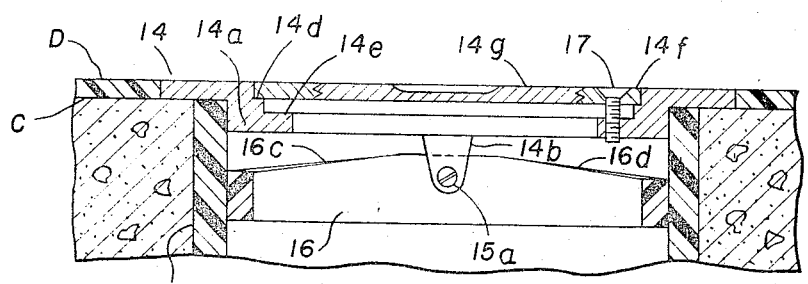
FIG. 2 is a sectional view showing the receptacle holder secured in the upper cylindrical portion of the box.
Figure 3:
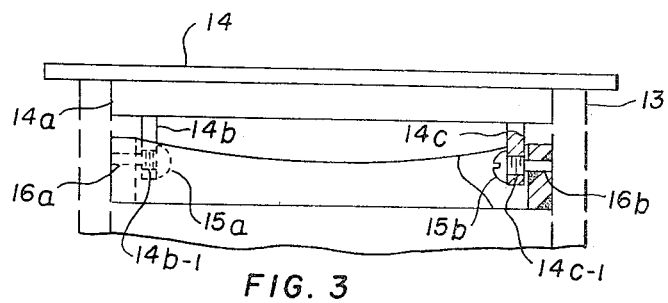
FIG. 3 is an end view of the receptacle holder of FIG. 2.

Referring now to FIGS. 2 and 3 of the drawings, the receptacle holder 14 includes an integral, downwardly depending circular ring 14a; said ring includes two projections 14b, 14c on opposite sides of the lower surface thereof. Screws 15a, 15b or other suitable fastening means pass through female threaded portions 14b–1, 14c–1 in projections 14b, 14c, respectively; a reduced, smooth shank portion thereof inserts into bores 16a, 16b in the upper portions of a sleeve 16. Sleeve 16 is preferably constructed of plastic or the like and slidably inserts into the bore of extension 13; said sleeve is secured in position in said extension by placing an adhesive such as plastic cement or the like on the outer surfaces thereof, or alternatively, on the upper, inner portion of extension 13.

As best seen in FIG. 2, the upper edge portions 16c, 16d of sleeve 16 preferably taper downward from the pivot points whereby the receptacle holder 14 may pivot about screws 15a, 15b to a greater extent (see FIG. 5) than would be the case had said sleeve not been so tapered.

The top surface of holder 14 includes first and second internal annular shoulders 14d, 14e, respectively. An internally threaded ring 14f, into which screwingly inserts cover 14g or the like, is secured on shoulder 14d. The flange of a conventional electrical or telephone fixture (not shown) is positioned on shoulder 14e and is secured in position by a plurality of screws 17 or the like which pass through tapered bores in ring 14f into corresponding female threaded portions in shoulder 14e. Removal of cover 14g permits access to the aforementioned electrical or telephone fixtures.

Asphalt tile D or any suitable flooring material may be secured to the concrete surface C in a conventional manner and may be cut to receive receptacle holder 14.

Figures 4, 6:
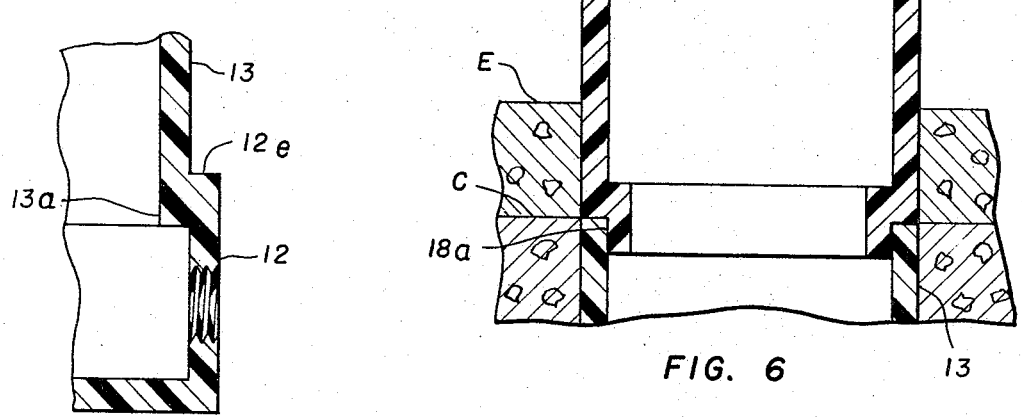
FIG. 4 is a sectional view through a flat in the junction box showing the construction of the lower cylindrical portion.
FIG. 6 is a sectional view showing an extension to the cylindrical portion to be used when a second floor is to be poured atop an existing floor.

As heretofore mentioned, the subject invention may be utilized in concrete flooring ranging from two and one-half to six inches in thickness. Referring now to FIG. 4 of the drawings, the lower portion 13a of extension 13 projects downwardly into the junction box 12. When box 10 is to be used in a concrete floor of two and one-half or three inches, for example, the surface of the concrete extends slightly above the offset portion 12e of the junction box; extension 13 is to be cut off at the surface of the concrete as heretofore described. Sleeve 16, inserting into said extension, bears against and is secured to the lower portion 13a of extension 13.

Figure 5:
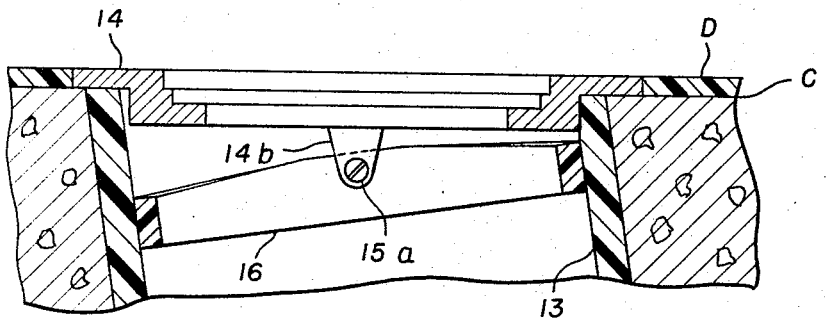
FIG. 5 is a sectional view showing the receptacle holder positioned in the uppermost cylindrical portion when the box is not in vertical alignment.

In the event that box 10 is not in exact vertical alignment, as illustrated in FIG. 5, the extension 13 is cut off at the surface C of the concrete and if required, the edges and upper interior portions of the extension may be smoothed or beveled. The exterior surface of sleeve 16 or the upper, interior portion of extension 13 is then coated with plastic cement or the like; the holder 14 is rotated in such a manner that the line between projections 14b, 14c is perpendicular to the central, longitudinal axis of extension 13 and the sleeve slidably inserted into extension 13. Receptacle holder 14, attached to sleeve 16 by means of screws 15a, 15b pivots about said screws whereby the upper surface of the receptacle holder 14 lies flush with and parallel to surface C of the concrete.

There is shown in FIG. 6 a cylindrical extension 18, preferably of the same composition and the same inside and outside diameters as extension 13, and which is received by extension 13 as by means of a collar 18a or the like. A conventional adhesive may additionally be used to secure the connection. Concrete may then be poured to the desired second level E; after the concrete has set extension 18 may be cut as heretofore described.

Figure 7:
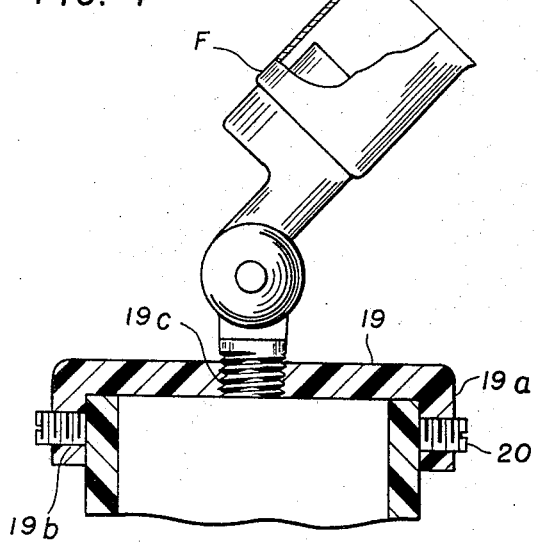
FIG. 7 is a sectional view of a modification of the invention used as a junction box including a conventional electrical fixture connected thereto.

Referring now to FIG. 7 of the drawings, the uppermost edge portion of extension 13 of FIG. 1 or the extension 18 of FIG. 6 may include a cover 19 which has a downwardly depending rim 19a; set screws 20 or the like screwingly insert into female threaded portions 19b in the rim, the innermost ends of said screws bear against the sides of extensions 13 or 18. The cover may contain a female threaded portion 19c of any desired diameter to accommodate a conventional electrical fixture, such as an outdoor light receptacle F or the like.

Figure 8:
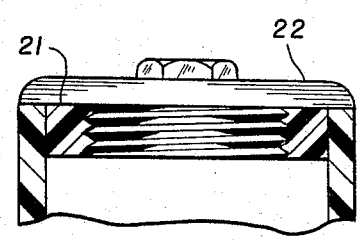
FIG. 8 is a sectional view of another modification of the invention used as an underground box.

As illustrated in FIG. 8, the subject invention may also be utilized as an underground or burial box; in such construction the uppermost portion of extension 13 or extension 18 may include an internally threaded ring 21 which inserts into and is secured in either of said extensions by gluing or the like. A cover 22 may screwingly insert into said ring 21.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

Having thus described my invention, what is claimed is:

1. An electrical outlet box to be inserted in a poured concrete floor comprising an integrally formed casing consisting of a base, a junction box and a vertically extending cylindrical member of uniform inside diameter, a receptacle holder consisting of an annular plate, first and second projections depending downwardly from diametrically opposed positions on said plate and integrally formed therewith, a cylindrical sleeve pivotally connected to said first and second projections radially exteriorly thereof, said sleeve being inserted in tight fitting relationship into said cylindrical member.

2. An electrical outlet box to be inserted in a poured concrete floor comprising an integrally formed base, junction box and a vertically extending cylindrical member of uniform inside diameter, a receptacle holder consisting of an annular plate, first and second projections downwardly depending from diametrically opposed positions on and integral with said plate, a cylindrical sleeve pivotally mounted on said projections radially exteriorly thereof whereby said receptacle holder pivots relative to said sleeve and said annular plate may be adjusted to a position wherein its top surface is parallel to the top surface of the poured concrete, said sleeve being inserted into the inside diameter of said cylindrical member in tight fitting relationship therewith.

3. An electrical outlet box to be inserted in a poured concrete floor comprising an integrally formed casing consisting of a base, a junction box and a vertically extending cylindrical member of uniform inside diameter, a receptacle holder consisting of a plate with first and second diametrically disposed integrally formed and downwardly depending projections, a cylindrical sleeve positioned radially outwardly of said projections and pivotally connected to said projections whereby said annular plate may be adjusted to a position wherein its top surface is parallel to the top surface of the poured concrete, said sleeve being inserted into the inside diameter of said cylindrical member in tight fitting relationship therewith.

4. An electrical outlet box to be inserted in a poured concrete floor comprising an integrally formed casing consisting of a base, a junction box and a vertically extending cylindrical member of uniform inside diameter, a receptacle holder consisting of an annular plate with first and second downwardly depending and diametrically oppositely positioned projections integral with said plate, a cylindrical sleeve positioned radially outwardly of said projections and pivotally connected to said projections, the outside diameter of said sleeve being lesser than the inside diameter of the cylindrical member, said sleeve being inserted into the cylindrical member in tight fitting relationship whereby the said annular plate may be adjusted to a position wherein its top surface is parallel to the top surface of said poured concrete.

5. An electrical outlet box to be inserted in a poured concrete floor comprising an integrally formed casing consisting of a base, a junction box and a vertically extending cylindrical member of uniform inside diameter, a receptacle holder consisting of an annular plate with first and second downwardly depending and diametrically oppositely positioned projections integral with said plate, a cylindrical sleeve positioned radially outwardly of said projections, a horizontally extending female threaded portion in each of said first and second projections, said sleeve including diametrically aligned bearing portions corresponding to the positions of the female threaded portions in said projections, a screw threadingly inserted into each female threaded portion in said first and second projections and terminating in a reduced smooth shank portion received in the respective aligned bearing portions in the sleeve whereby the said sleeve may pivot relative to the annular plate and the annular plate of said receptacle holder may be adjusted to a position wherein its top surface is parallel to the top surface of the poured concrete, said sleeve being inserted in the cylindrical member in tight fitting relationship therewith.

References Cited
UNITED STATES PATENTS

| | | | |
|---|---|---|---|
| 1,038,963 | 9/1912 | Roe | 220—3.7 |
| 1,239,453 | 9/1912 | Block | 220—3.8 |
| 3,047,650 | 7/1962 | Reiland | 220—3.3 |
| 3,189,862 | 6/1965 | Vleerick et al. | 220—3.4 |

THERON E. CONDON, *Primary Examiner.*

JAMES R. GARRETT, *Examiner.*